United States Patent
Arunkumar et al.

(10) Patent No.: US 10,360,357 B2
(45) Date of Patent: Jul. 23, 2019

(54) PERSONAL IDENTIFICATION USING ACTION SEQUENCES DETECTED BY SENSORS

(71) Applicant: International Business Machines Corporation, Armonk, NY (US)

(72) Inventors: Saritha Arunkumar, Basingstoke (GB); Kuntal Dey, New Delhi (IN); Nizar Lethif, Croton-on-Hudson, NY (US); Enara C. Vijil, Croton-on-Hudson, NY (US)

(73) Assignee: International Business Machines Corporation, Armonk, NY (US)

( * ) Notice: Subject to any disclaimer, the term of this patent is extended or adjusted under 35 U.S.C. 154(b) by 145 days.

(21) Appl. No.: 15/402,318

(22) Filed: Jan. 10, 2017

(65) Prior Publication Data
US 2018/0196682 A1 Jul. 12, 2018

(51) Int. Cl.
*G06F 21/31* (2013.01)
*G06F 9/445* (2018.01)

(52) U.S. Cl.
CPC ........ *G06F 21/316* (2013.01); *G06F 9/44521* (2013.01)

(58) Field of Classification Search
CPC .................. G06F 9/44505; G06F 9/44521
See application file for complete search history.

(56) References Cited

U.S. PATENT DOCUMENTS

| | | | |
|---|---|---|---|
| 8,073,204 B2 | 12/2011 | Kramer et al. | |
| 8,831,297 B2 | 9/2014 | Rowe et al. | |
| 9,678,559 B1 * | 6/2017 | Devries | G06F 1/3265 |
| 2006/0115128 A1 | 6/2006 | Mainguet | |
| 2007/0259716 A1 * | 11/2007 | Mattice | G06F 3/013 463/36 |

(Continued)

FOREIGN PATENT DOCUMENTS

| | | |
|---|---|---|
| CA | 2832315 A1 | 10/2012 |
| EP | 1103952 B1 | 6/2005 |

OTHER PUBLICATIONS

P. Mell et al., "The NIST Definition of Cloud Computing", National Institute of Standards and Technology, Information Technology Laboratory, Sep. 2011, pp. 1-7.

(Continued)

*Primary Examiner* — Phil K Nguyen
(74) *Attorney, Agent, or Firm* — Law Office of Jim Boice (57) ABSTRACT

A method modifies a physical device for use by a particular person. One or more processors receive information from a sensor indicating a detection by the sensor of a sequence of actions performed by an unidentified person. The sequence of actions are physical actions performed in a particular order, and the physical actions are disparate types of physical movements performed by the unidentified person. One or more processors compare the sequence of actions performed by the unidentified person a known sequence of actions for a particular person. In response to the sequence of actions performed by the unidentified person matching the known sequence of actions for the particular person, one or more processors identify the unidentified person as the particular person and then modify a physical device for use by the particular person.

17 Claims, 6 Drawing Sheets

(56) References Cited

U.S. PATENT DOCUMENTS

| | | | | |
|---|---|---|---|---|
| 2014/0114742 | A1* | 4/2014 | Lamontagne | G06Q 30/0242 |
| | | | | 705/14.41 |
| 2014/0203798 | A1* | 7/2014 | O'Mahony | G01R 31/31726 |
| | | | | 324/76.82 |
| 2014/0247206 | A1* | 9/2014 | Grokop | G06F 1/3287 |
| | | | | 345/156 |
| 2014/0270714 | A1* | 9/2014 | Osminer | H04N 21/4131 |
| | | | | 386/296 |
| 2014/0378159 | A1* | 12/2014 | Dolbakian | H04W 64/006 |
| | | | | 455/456.1 |
| 2016/0055326 | A1* | 2/2016 | Votaw | G06F 21/316 |
| | | | | 726/19 |
| 2016/0371476 | A1* | 12/2016 | Turgeman | G06F 21/316 |
| 2017/0098068 | A1* | 4/2017 | Mantri | G06F 21/36 |
| 2018/0130098 | A1* | 5/2018 | Swanson | G06Q 30/0269 |
| 2018/0139069 | A1* | 5/2018 | Rawlins | H04L 12/282 |
| 2018/0145990 | A1* | 5/2018 | DiAcetis | H04L 63/107 |

OTHER PUBLICATIONS

Zhou et al., "A Face and Fingerprint Identity Authentication System Based on Multi-Route Detection". Elsevier B.V., sciencedirect.com, Oct. 27, 2006, Neurocomputing 70 (2007), pp. 922-931.

Ross et al., "Introduction to Multibiometrics". Handbook of Biometrics, Springer US, 2008, pp. 271-292.

CNN Wire, "Google's Plan to Kill Passwords on Android Devices". WTVR, May 26, 2016. <http://wtvr.com/2016/05/26/GOOGLES-PLAN-TO-KILL-PASSWORDS-ON-ANDROID-DEVICES/>.

Argenta et al., "Extracting Short Stories From Large Data Sets". Proceedings of the 2014 Workshop on Human Centered Big Data Research. ACM, 2014.

Wang et al., "Conference 9026: Video Surveillance and Transportation Imaging Applications 2014." Electrnoic Imaging (2014): 227.

Munaro et al., "3D Reconstruction of Freely Moving Persons for Re-Identification With a Depth Sensor". 2014 IEEE International Conference on Robotics and Automation (ICRA). IEEE, 2014.

\* cited by examiner

PERSONAL IDENTIFICATION USING ACTION SEQUENCES DETECTED BY SENSORS

BACKGROUND

The present invention relates to the field of sensors, and particularly to sensors that monitor persons. Still more particularly, the present invention relates to controlling a physical device based on an identity of a particular person as established by one or more sensors that monitor that particular person.

SUMMARY

In one or more embodiments of the present invention, a computer-implemented method modifies a physical device for use by a particular person. One or more processors receive a signal (information) from a sensor indicating a detection by the sensor of a sequence of actions performed by an unidentified person. The sequence of actions are physical actions performed in a particular order, and the physical actions are disparate types of physical movements performed by the unidentified person. One or more processors compare the sequence of actions performed by the unidentified person as detected by the sensor to a known sequence of actions for a particular person. In response to the sequence of actions performed by the unidentified person as detected by the sensor matching the known sequence of actions for the particular person, one or more processors identify the unidentified person as the particular person. In response to identifying the unidentified person as the particular person, one or more processors modify a physical device, which is at least partially unconnected to the sensor, for use by the particular person.

Other embodiments of the present invention include a computer program product and a system.

DETAILED DESCRIPTION

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
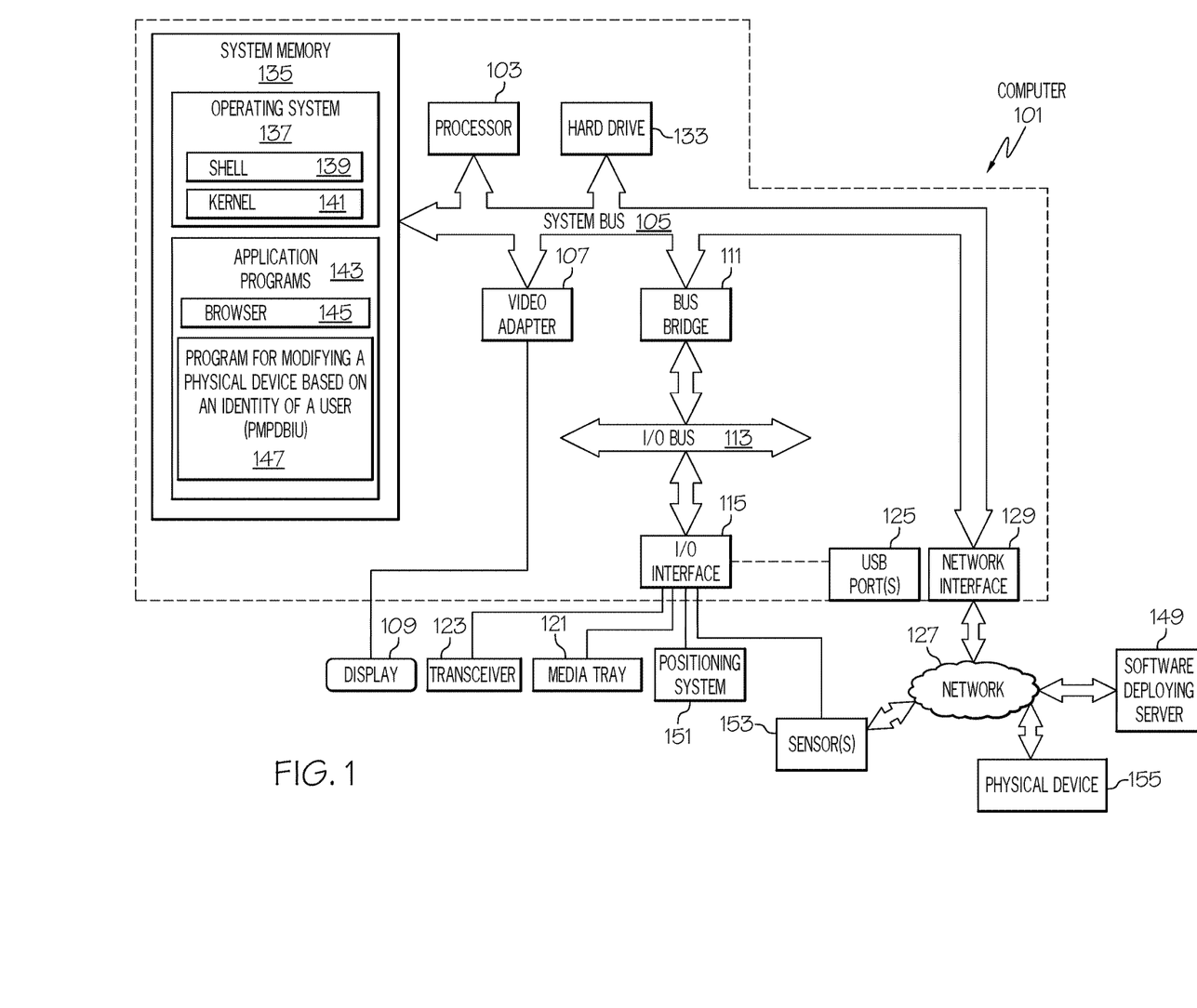
FIG. 1 depicts an exemplary system and network in which the present invention may be implemented.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 101 may be implemented within one or more of: software deploying server 149 (FIG. 1); sensors 153 (FIG. 1); physical device 155 (FIG. 1); monitoring system 201 (FIG. 2); idiosyncrasy miners 303 (FIG. 3); sequence learners 305 (FIG. 3); external engine 307 (FIG. 3); sequence inferencers 311 (FIG. 3); and/or multiple sequence combiner and error minimizer 313 (FIG. 3).

As depicted in FIG. 1, exemplary computer 101 includes a processor 103 that is coupled to a system bus 105. Processor 103 may utilize (and/or include) one or more processors, each of which may have one or more processor cores. Hard drive interface 131, system memory 135, and video adapter 107, which drives/supports a display 109 (which may be a touch screen capable of receiving touch inputs), are also coupled to system bus 105. Hard drive interface 131 interfaces with a hard drive 133. System bus 105 is coupled via a bus bridge 111 to an input/output (I/O) bus 113.

An I/O interface 115 is coupled to I/O bus 113. The I/O interface 115 facilitates communications with various devices, including (without limitation) media tray 121 (which may include storage devices such as CD-ROM drives, multi-media interfaces, etc.), transceiver 123 (capable of transmitting and/or receiving electronic communication signals), universal serial bus (USB) port(s) 125, positioning system 151, and sensor(s) 153. While the format and/or function of the devices and ports connected to I/O interface 115 may be any known to those skilled in the art of computer architecture, in one embodiment some or all of the ports are (USB) ports.

Positioning system 151 can determine a real-time current location of computer 101, and/or sensor(s) 153 (and/or any person or thing being monitored by sensors). By way of example only, positioning system 151 may be a combination of accelerometers, speedometers, etc., or it may be a global positioning system (GPS) that utilizes signals from space-based satellites to determine two-dimensional or three-dimensional locations.

Sensors 153 can detect an environment associated with computer 101, including persons being monitored by computer 101. More specifically, when detecting the action(s) of persons, sensors 153 may be one or more cameras, thermal imagers, microphones, chemical sensors (for detecting a scent of a person), etc., that are able to detect one or more actions performed by a particular person.

As depicted, computer 101 is able to communicate with one or more network connected devices e.g., software deploying server(s) 149, sensor(s) 153 and/or physical device(s) 155 via network interface 129 and network 127. Network interface 129 is a hardware network interface, such as a network interface card (NIC), etc. In some embodiments Network 127 may include one or more of: a wired network; a wireless network; an external network (of networks) such as the Internet; an internal network such as an Ethernet; and a virtual private network (VPN). In one or more embodiments, network 127 includes a wireless network, such as a Wi-Fi network, and a cellular network, etc.

As described herein, physical device 155 may be a door with a remotely controllable electromechanical lock, a vehicle with an enabling mechanism for starting the vehicle, a sensor, or any other physical device that is for the use of a person. This "use" may be to allow the person to operate the device (e.g., unlocking a door device to be used by the person), or may be to enable to the system to further identify the person (e.g., activating a second sensor device).

System memory 135 can be defined as a lowest level of computer-readable volatile memory (not shown) of computer 101. Such volatile memory can include additional, higher levels of volatile memory (not shown), including, but not limited to, cache memory, registers and buffers. Data and/or computer software that is stored in system memory 135 typically includes one or more operating systems (OS) 137 and one or more application programs 143.

As depicted, OS 137 includes a shell 139. Shell 139, which is sometimes referred to as a command processor, is generally considered to be at the highest level of an operating system software hierarchy. Shell 139 typically provides (serves as) a command interpreter and an interface between the operating system and one or more of: user(s), and application programs 143 and facilitate communications between various levels of the OS. By way of example only, the shell can provide a system prompt, interpret commands entered by keyboard, mouse, or other user input media, and send the interpreted command(s) to the appropriate lower levels of the operating system (e.g., a kernel 141) for processing. In another more specific example, shell 139 can provide transparent user access to resources such as application programs 143 and can execute commands entered into a command line user interface or from a file. Although in some embodiments shell 139 is a text-based, line-oriented user interface, the present invention can equally well support other user interface modes, such as graphical, voice, gestural, etc.

As depicted, OS 137 also includes kernel 141, which includes lower levels of functionality for OS 137, including (by way of example and without limitation) providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive messages via network interface 129 and network 127, such as the Internet using hypertext transfer protocol (HTTP) messaging. Communications can be thus enabled between application programs and other network-connected devices, systems and servers, such as software deploying server 149.

Application program(s) 143, which reside in computer 101's system memory (as well as software deploying server 149's system memory) also include a Program for Modifying a Physical Device Based on an Identity of a User (PMPDBIU) 147 in accordance with the present invention. In some embodiments, PMPDBIU 147 is implemented code (computer/processor readable/executable software) for implementing processes in accordance with the present invention, including (but not limited to) those described in FIGS. 2-4. In one embodiment, computer 101 is configured to download PMPDBIU 147 from software deploying server 149, including in an on-demand basis, wherein the code in PMPDBIU 147 is not downloaded until needed for execution. In one embodiment of the present invention, software deploying server 149 performs some or all of the functions associated with the present invention (including execution of some or all of PMPDBIU 147), thus freeing computer 101 from having to use its own internal computing resources to execute some or all PMPDBIU 147 functions.

The hardware elements depicted in computer 101 are not intended to be exhaustive or exclusive, but rather are intended as representative, to facilitate understanding of certain components used in exemplary embodiments of the present invention. For instance, computer 101 may include alternate memory storage devices (not depicted) such as magnetic cassettes, digital versatile disks (DVDs), Bernoulli cartridges, and the like. These and other variations are intended to be within the spirit and scope of the present invention.

As described herein, one or more embodiments of the present invention provide a system and/or associated methods/programs to identify a person based on a sequence of actions performed by him/her as detected by a set of sensors, from within a given subgroup of individuals known to the system, as well as the ability of a sensor to transfer the identity to another sensor to assist the second sensor to accurately identify a person. In some embodiments, once the identity of the person is established beyond a predefined confidence level, a device is activated for use by that identified person.

In other words, the present invention can use a set of sensors under a controlled environment to monitor a person's sequence of actions, and then use personal idiosyncrasies (sequence of actions) of a known person to identify a person and/or in some cases to obtain assistance in identifying the person via a second sensor (along with a communication of a "suggested" identification of that person). The identification can allow the system to activate a physical device for the benefit of that person.

Figure 2:
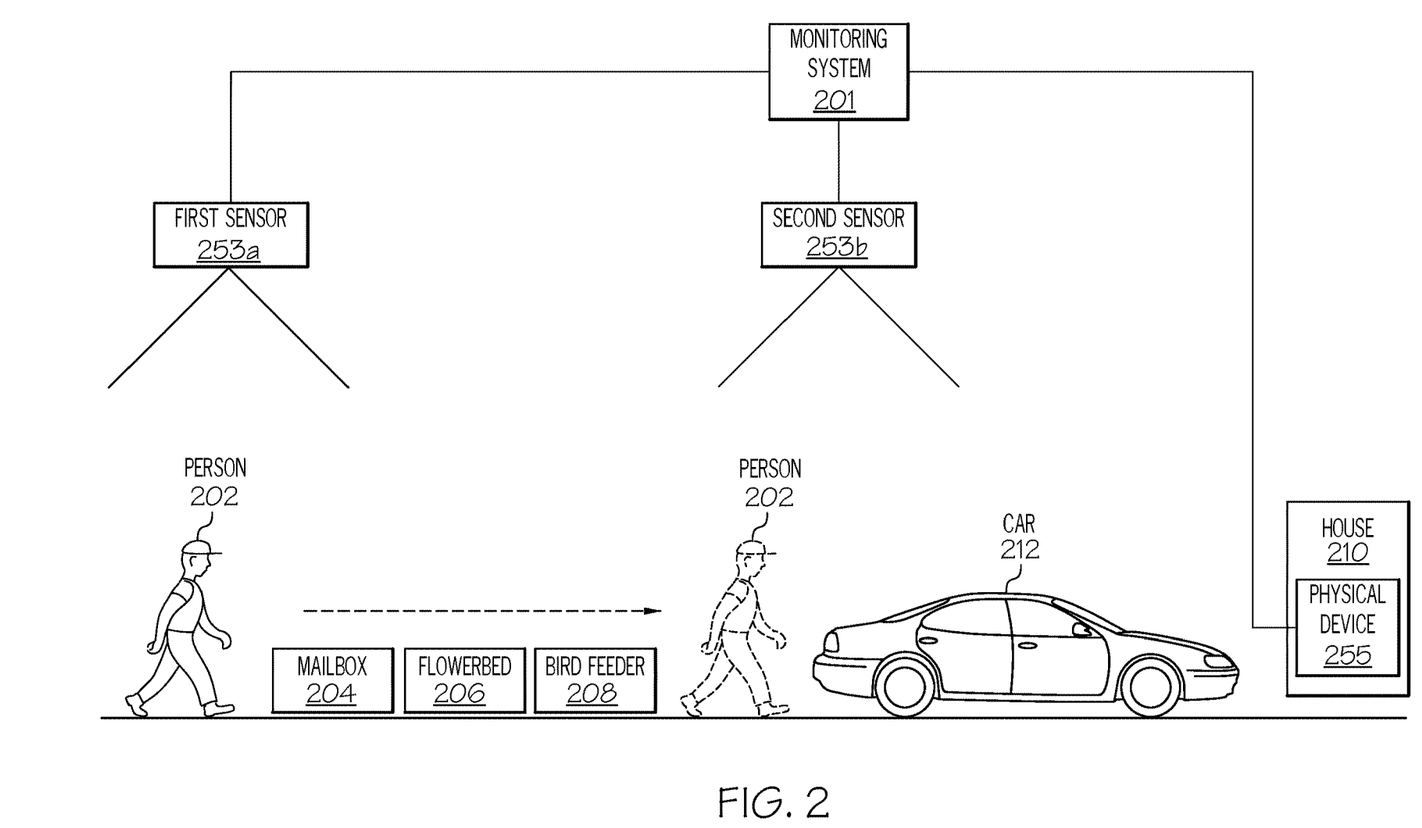
FIG. 2 illustrates a monitoring system in accordance with one or more exemplary embodiments of the present invention.
Figure 3:
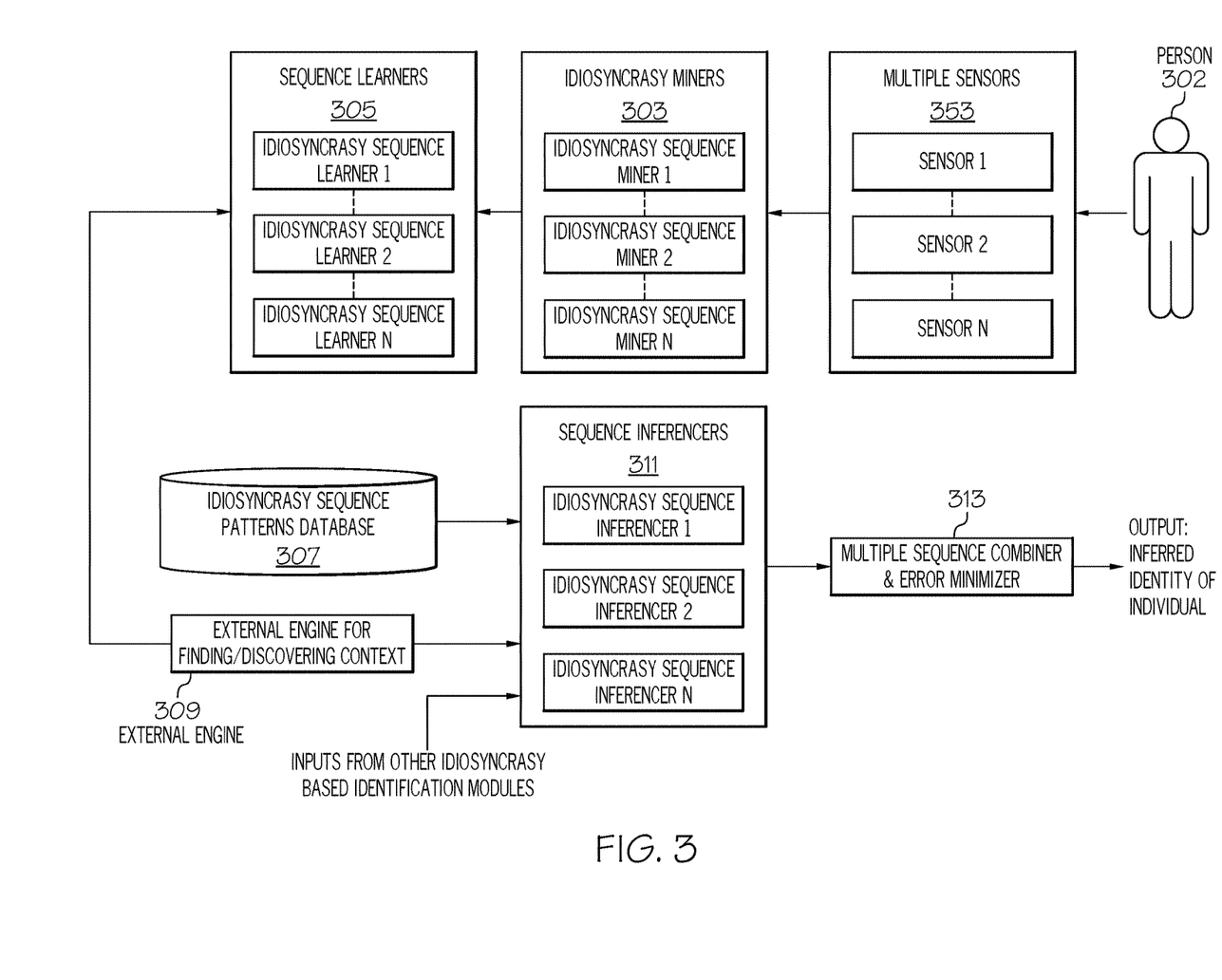
FIG. 3 depicts a high-level system architecture diagram in accordance with one or more exemplary embodiments of the present invention.

With reference now to FIG. 2, assume that person 202 is initially an unidentified person (i.e., the system does not "know" who person 202 is). Assume further that first sensor 253*a* (analogous to one of the sensor(s) 153 shown in FIG. 1) initially monitors unidentified person 202 in order to detect a temporal sequence of actions performed by person 202. For example, first sensor 253*a* may be a camera that detects person 202 performing a particular sequence of actions. That is, assume that person 202 is walking up to his house 210. (Note that the terms "his" and "he" and "him" are used generically to identify a person of any gender.) It is the routine of person 202 to 1) check for mail at his mailbox 204; 2) check on his flowerbed 206; and 3) check on his bird feeder 208, in that order. While other persons may just as easily check on the flowerbed 206 and birdfeeder 208 before picking up mail from the mailbox 204, this is not the known (to monitoring system 201) routine of person 202.

Thus, first sensor 253*a* (e.g., a camera) will capture images of person 202 performing his routine of actions (i.e., check for mail, check the flowerbed, check the bird feeder) in order to allow monitoring system 201 to make a preliminary identification of person 202 (i.e., identify person 202 as a particular person).

However, monitoring system 201 may not yet be satisfied that the identity of person 202 has been established. As such, monitoring system 201 may activate second sensor 253*b*, which may be another camera having a different field of view from that of first sensor 253*a*, or may be another type of sensor (e.g., a microphone). Once second sensor 253*b* (i.e., a microphone) is activated, it will detect another sequence of actions performed by person 202, such as walking with a particular gait that is recognized by the sound of his footfall, followed by whistling as he approaches his house 210, followed by making no sounds with his feet when he stops walking upon arriving next to the house 210. Again, another person may walk, stop and whistle, but the routine habit of the particular person 202 (known to monitoring system 201) is to walk, whistle, and stop. As such, the monitoring system 201 now has reinforcing sensor readings from second sensor 253*b*, confirming the identity of person 202.

Once the identity of person 202 is confirmed (to a predefined confidence level) by monitoring system 201, then monitoring system 201 will modify physical device 255 for the use of person 202. For example, if physical device 255 is a door, then monitoring system 201 will modify that door for use by person 202 by unlocking it (e.g., unlocking a remotely-controlled door lock on the door). In another example, if physical device 255 is an alarm system, then monitoring system 201 will modify that alarm system for use by person 202 by deactivating it as person 202 approaches his house 210. These examples are not to be construed as limiting the scope and use of the present invention.

Thus, the monitoring system 201 will mine (and learn) idiosyncrasies of person 202, where the data is obtained from first sensor 253*a* and/or second sensor 253*b*, which are positioned at known and fixed geolocations (such as, at the entry point of a house or room, at a back-office point of entry, inside a car, etc.)

Monitoring system 201 used previously learned sequence patterns associated with person 202 as detected by first sensor 253*a* and/or second sensor 253*b* in order to infer the identity of person 202. In some embodiments of the present invention, monitoring system's 201 performance of the inference includes a nearest-match algorithm that minimizes the total error of the observed idiosyncrasy sequence/pattern, with the set of known idiosyncrasy sequence, for each given individual, for each sensor, at each "time of the day" (for instance, person 202 makes a certain sequence of types of noises in the evenings when he returns to his house 210 from his office, but makes a different sequence of types of noises when he leaves his house 210 in the morning).

In some embodiments of the present invention, in order to 1) determine the confidence level in the identity of person 202 and/or 2) determine whether to activate secondary and tertiary sensors in order to identify person 202, monitoring system 210 can consider any mismatches between one or more of: (a) the sequence of the idiosyncrasies; (b) the value/amount of each of the idiosyncratic signals in a given context; and (c) the expected sequence and value/amount assigned to idiosyncratic signals in such context.

In one or more embodiments of the present invention, monitoring system 201 is trained to recognize only a few persons (e.g., less than 10). Thus, either monitoring system 201 will recognize one of these few/10 persons (using sensor readings from first sensor 253*a* and/or second sensor 253*b*), or else will assume that person 202 is unauthorized e.g., an intruder. Thus, the present invention presents an improvement over computationally intense (and thus slow) systems that perform facial recognition, detailed movement analysis, biometric sensor readings, voice recognition, etc.

The foregoing example (described with reference to FIG. 2) illustrates an embodiment of the present invention in which person 202 is approaching his house 210. By way of further example (and without limitation), we will next consider another embodiment (also with reference to FIG. 2) in which person 202 is entering his car 212, and would benefit from the car 212 being adjusted (e.g., changing the car seat height and climate control settings, etc.) to his preferences. In this example/embodiment, signals detected by sensors such as first sensor 253*a* and/or second sensor 253*b* may detect the sound of footsteps made by person 202 while walking towards car 212 (a first action), a strength with which the door is closed on car 212 (a second action), a sound generated by person 202 while sitting and pulling the seat belt in car 202 (a third action), etc. Thus, the sequence of actions performed by a person A (one instance of person 202) might be to: 1) enter the car; 2) engage the seat belt; and 3) close the door lock and simultaneously push the brake on the car 212. Another person B (another instance of person 202) on the other hand, might: 1) enter the car; 2) lock the door; 3) engage the seat belt; and 4) straighten the steering wheel. In this example, we will assume that the foregoing present a unique sequence of actions that distinguish Person B from Person A.

In one or more embodiments of the present invention, there is a learning phase in which monitoring system 201 tries to match the sights/sounds/etc. it captures with the person. The learning phase may involve additional verification (data labeling/calibration) from the user. Once the system has enough confidence in its prediction, such additional verification will no longer be required.

Referring again to FIG. 2, in one or more embodiments of the present invention, once monitoring system 201 identifies person 202, the identity of person 202 (along with an event) can be transferred to other devices/systems, such as the ignition system on car 212, the door lock (physical device 255) on the door of his house 210, etc. In other words, various sensors can operate in conjunction. For example, one or more sensors within car 212 may have conclusively identified Person 202 as the driver (not depicted) of car 212. When car 212 pulls up to house 210, Person 202 may get out of car 212 to enter house 210. In some embodiments, the sensor(s) in car 212 will send an identification signal to monitoring system 201 to expect sensor readings from first sensor 253*a* and/or second sensor 253*b* (aimed at the area outside of car 212) to expect to detect a sequence of actions relevant to Person 202. If first sensor 253*a* and/or second sensor 253*b* detect a sequence of actions that are close (even if not as close without the prompting from the sensor readings from inside of car 212 regarding the identity of the person who is exiting the car 212), then monitoring system 201 will unlock house 210 (i.e., unlock the physical device 255 (door lock) on the house 210). While allowing the system to accept a less definitive "suggested" identification of person 202, the tradeoff of 1) increased speed versus 2) decreased security is deemed acceptable for some embodiments of the inventive system.

Thus, in this example, the sensor at the user's home uses the event <PersonA, got out of car>+the event <door opened>+<foot steps indicate person A> as features when it tries to identify the person who entered the home. Through this mechanism of identity state transfer (from sensors inside the car to sensors outside the car), the system improves the overall accuracy of the identification while using fewer computing resources, thus improving the functionality of monitoring system 201.

In one or more embodiments of the present invention, the monitoring system 201 stores a temporal sequence of states/actions associated with an identity (i.e., a person), along with expected time taken values to execute each signal as well as expected time-gaps for the sequence to move from one state to the next. That is, not only are sequences of actions evaluated in order to identify the person, but the length of time each action takes is also considered. Thus, if a person's second action upon entering his/her car is to fasten the seatbelt, the amount of time that he/she requires to faster the seatbelt is also an indicator of his/her identity, since each person may take a different amount of time to fasten the seatbelt.

In one or more embodiments of the present invention, weighted cumulative error values (min-error/max-probability) are used to determine whether or not the identity of the person has been established.

FIG. 3 depicts an exemplary high-level system architecture diagram in accordance with the present invention. As depicted, a person 302 (analogous to person 202 shown in FIG. 2) is monitored by multiple sensors 353 (analogous to first sensor 253*a* and second sensor 253*b* shown in FIG. 2). Sensor readings from multiple sensors 353 are sent to idiosyncrasy miners (e.g., embodied as part of computer application program PMPDBIU 147 (FIG. 1) executing in conjunction with monitoring system 201 (FIG. 2)) to identify various sequences of actions taken by person 302. These sequences are sent from idiosyncrasy miners 303 to sequence learners 305 (e.g., also embodied as part of computer application program PMPDBIU 147 (FIG. 1) executing in conjunction with monitoring system 201 (FIG. 2)), which stores these sequences in an idiosyncrasy sequence patterns database 307.

An external engine 309 then identifies the context in which the person 302 is being monitored. For example, the context may be a certain time of day (as determined by a clock within monitoring system 201), a particular location (as determined by positioning system 151 shown in FIG. 1), a particular object being monitored (e.g., car 212, which belongs to person 202 and is identified by a universal unique identifier (UUID) that is sent from car 212 to monitoring system 201), etc.

Information from the idiosyncrasy sequence patterns database 307, external engine 309, and/or other inputs from other idiosyncrasy based identification modules (e.g., other sensors, databases, heuristic systems, etc.) is then sent to sequence inferencers 311 (e.g., logic such as PMPDBIU 147 executing within monitoring system 201 shown in FIG. 2), which infer the identity of person 302 based on the shown inputs.

A multiple sequence combiner and error minimizer 313 (e.g., logic such as PMPDBIU 147 executing within monitoring system 201 shown in FIG. 2) then outputs the inferred identity of the person 302. Multiple sequence combiner and error minimizer 313 examines the various sequences of actions, and determines their level of trustworthiness in identifying person 302 based on comparisons to other stored sequences, the number of persons being monitored, the context of the location and activities of the person, etc.

Figure 4:
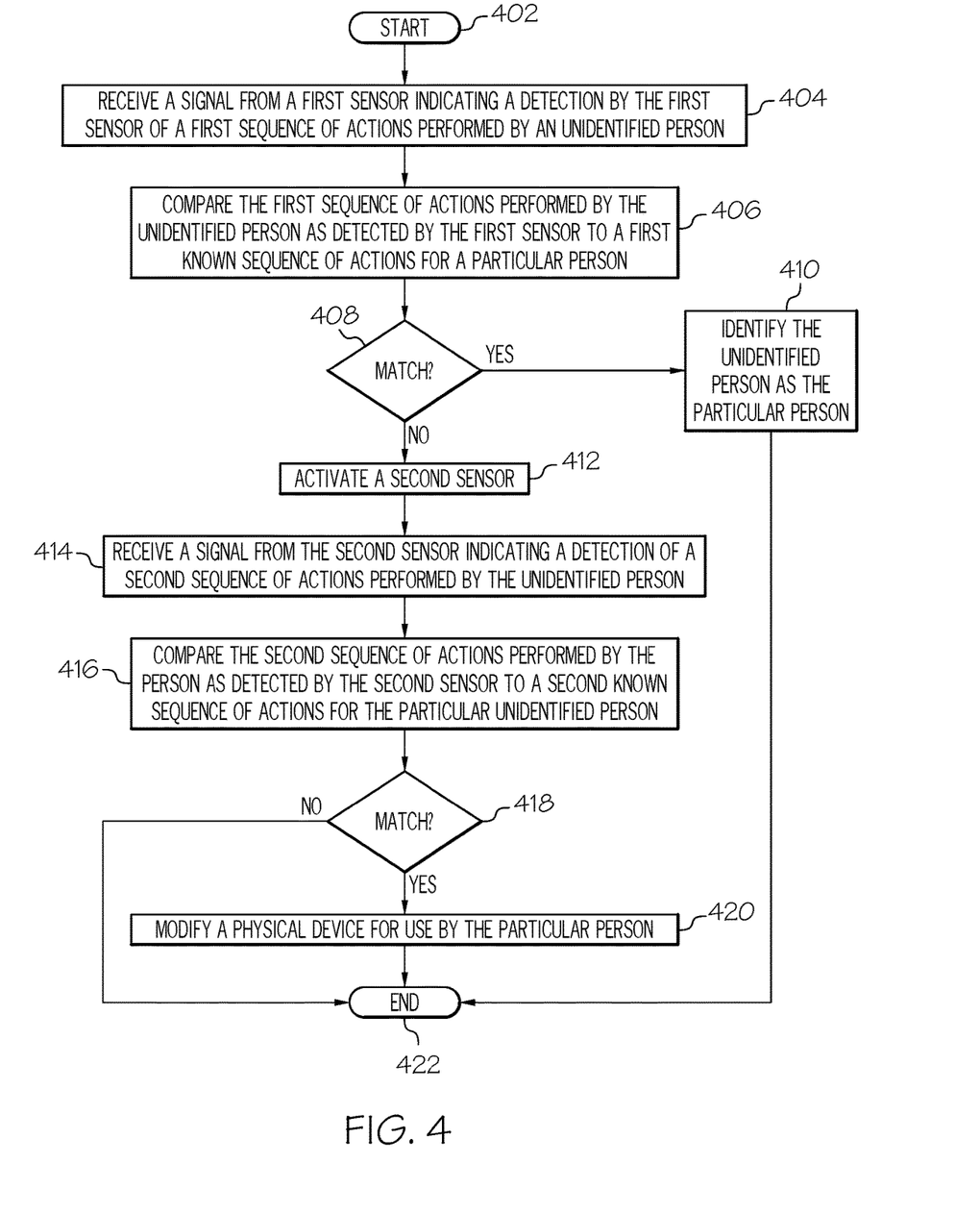
FIG. 4 is a high-level flow chart illustrating a process in accordance with one or more exemplary embodiments of the present invention.

With reference now to FIG. 4, a high-level flow chart illustrating a process for modifying a physical device for use by a particular person in accordance with one or more embodiments of the present invention is presented.

After initiator block 402, one or more processors (e.g., within monitoring system 201) receive information from a first sensor (e.g., first sensor 253*a* shown in FIG. 2) indicating a detection by the first sensor of a first sequence of actions performed by an unidentified person (e.g., person 202), as described in block 404 in FIG. 4. The first sequence of actions are physical actions performed in a predefined order, and are disparate types of physical movements performed by the unidentified person. For example, the first sequence of actions may be walking to mailbox 204, checking flowerbed 206, and then checking bird feeder 208.

As described in block 406, one or more processors compare the first sequence of actions performed by the unidentified person as detected by the first sensor to a first known sequence of actions for a particular person (e.g., within the idiosyncrasy sequence patterns database 307 shown in FIG. 3).

As described in query block 408, if there is a match, then one or more processors identify the unidentified person as the particular person who is associated with the first known sequence of actions, as described in block 410. The system (e.g., monitoring system 201) will then modify a physical device (e.g., an ignition in car 212, a physical device 255 such as an alarm system, a door lock, etc. in a house 210, etc.) for use by the person, as described in block 420.

However, in response to the first sequence of actions performed by the unidentified person as detected by the one or more sensors failing to match the first known sequence of actions for the particular person (returning to query block 408), a second sensor (e.g., second sensor 253*b*) is activated, as described in block 412.

As described in block 414, one or more processors then receive information from the second sensor indicating a detection of a second sequence of actions performed by the unidentified person. In one embodiment of the present invention, this second sequence of actions is different from the first sequence of actions. However, in another embodiment of the present invention, this second sequence of actions is the same as the first sequence of actions (e.g., the person repeats the same sequence of actions).

As described in block 416, one or more processors then compare the second sequence of actions performed by the person as detected by the second sensor to a second known sequence of actions for the particular unidentified person. If there is a match (query block 418), then the physical device is further modified (i.e., as it would have been modified if the readings from the first sensor were sufficient) for use by the particular person.

The flow chart ends at terminator block 422.

In some embodiments of the present invention, the physical device is a second sensor that further monitors the first known sequence of actions performed by the unidentified person. That is, the physical device may be the ultimate device that is used by the person (e.g., a lock on house 210) or it may be the second sensor 253*b*, which is used by person 202 to allow the monitoring system 201 to further identify person 202.

In some embodiments of the present invention, the first sensor may be a first type of sensor (e.g., a camera) and the second sensor may be a second type of sensor (e.g., a microphone), such that the first type of sensor and the second type of sensor are different types of sensors.

In some embodiments of the present invention, the first sensor may be located in a first location and the second sensor may be located in a second location, such that only the first type of sensor is permitted in the first location and only the second type of sensor is permitted in the second location. For example, assume that only microphones are allowed to monitor the location outside of a building (e.g., due to regulatory restrictions), and only cameras are allowed to monitor an interior of the building (e.g., due to security issues). As such, the first sensor is a microphone that monitors the exterior of the building and the second sensor is a camera that monitors the interior of the building, in order to identify person 202.

In some embodiments of the present invention and as described herein, the first sensor and the second sensor are from a group of sensors consisting of a camera, a thermal sensor, and a microphone.

In some embodiments of the present invention, one or more processors may set a first confidence level for the first sequence of actions matching the first known sequence of actions. The processor(s) set a second confidence level for the second sequence of actions matching the second known sequence of actions. In response to the first confidence level failing to reach a predefined level, the processor(s) sum the first confidence level and the second confidence level. In response to a sum of the first confidence level and the second confidence level reaching the predefined level, the processor(s) confirm that the unidentified person is the particular person. That is, if readings from the first sensor 253*a* cause the monitoring system 201 to be 40% sure of the identity of the person 202, and readings from the second sensor 253*b* cause the monitoring system 201 to be 50% sure of the identity of the person 202, then the monitoring system

201 will be 90% sure of the identity of the person 202, since the levels of confidence may be cumulative. This accumulation may be unweighted (as just described), or averaged (such that the confidence level would be 50% plus some percentage of the 40%, since the 50% is more trustworthy due to the front-end work performed by the first sensor).

In some embodiments of the present invention, one or more processors may confirm that the unidentified person is the particular person based on a context of the first sequence of actions performed by the unidentified person (e.g., based on the time of day, location, etc. provided by the external engine 309 shown in FIG. 3).

The present invention may be implemented in one or more embodiments using cloud computing. Nonetheless, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
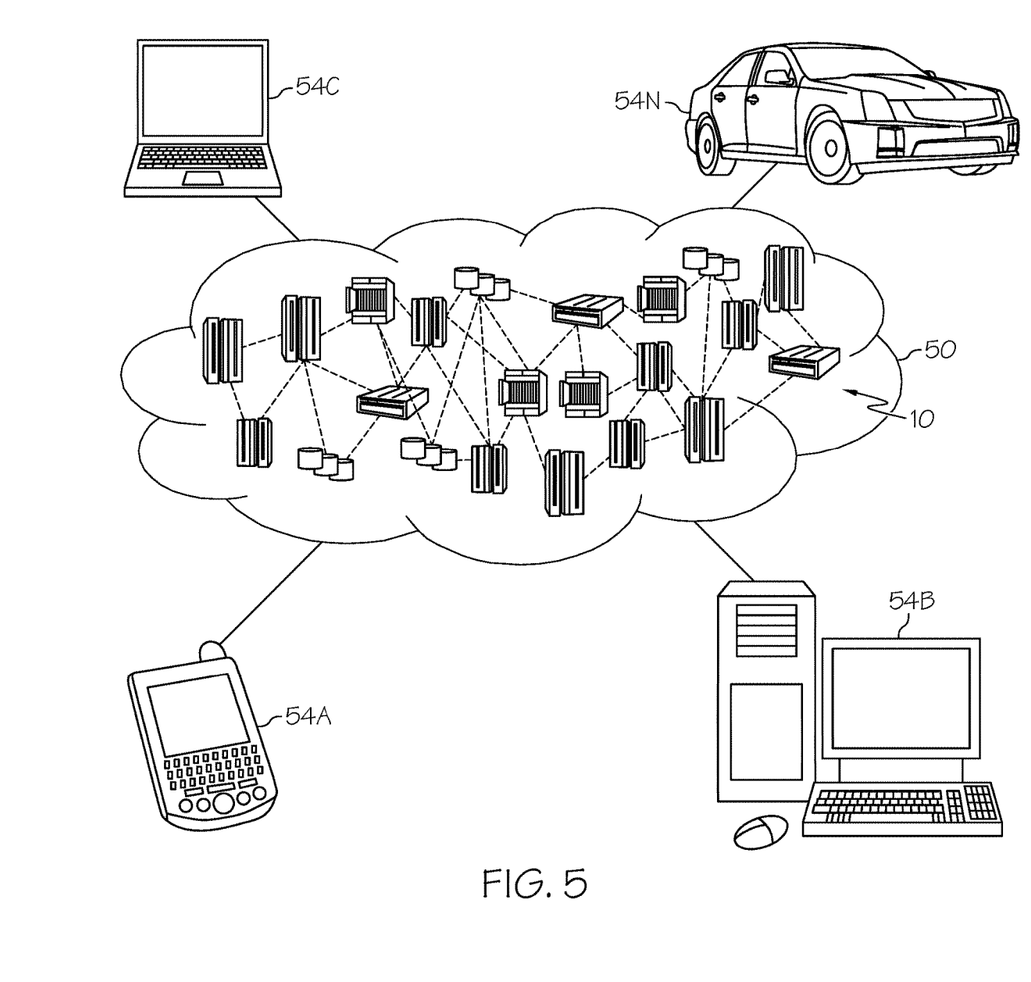
FIG. 5 depicts a cloud computing environment according to one or more exemplary embodiments of the present invention.

Referring now to FIG. 5, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 5 are intended to be illustrative only and that computing nodes 10 and cloud computing environment 50 can communicate with any type of computerized device over any type of network and/or network addressable connection (e.g., using a web browser).

Figure 6:
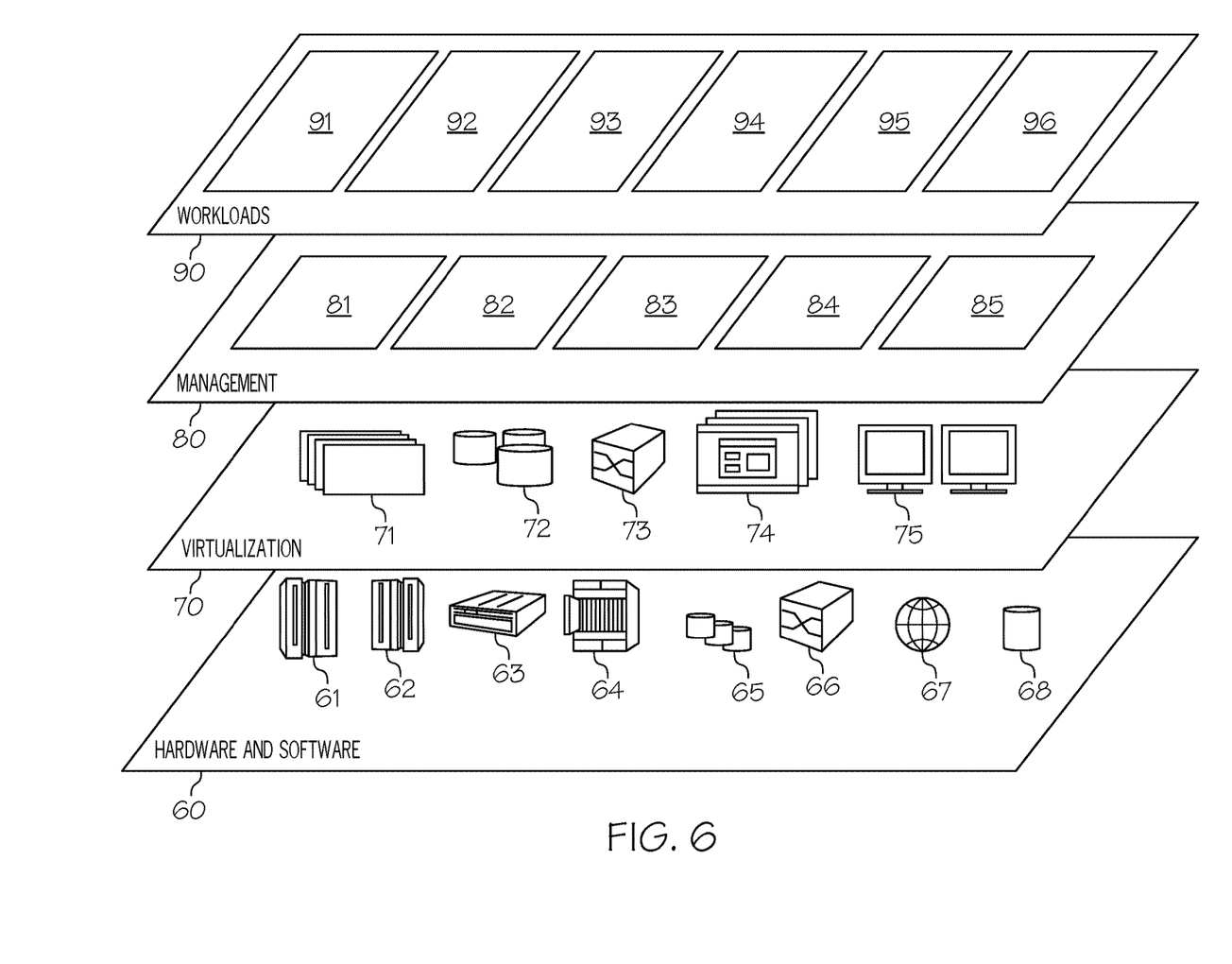
FIG. 6 depicts abstraction model layers of a cloud computer environment according to an exemplary embodiment of the present invention.

Referring now to FIG. 6, an exemplary set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and physical device control processing 96, in accordance with one or more embodiments of the present invention.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

The present invention may be implemented through the use of a Very High Speed Integrated Circuit (VHSIC) Hardware Description Language (VHDL) program. VHDL is an exemplary design-entry language for describing an integrated circuit, such as a Field Programmable Gate Arrays (FPGA), Application Specific Integrated Circuit (ASIC), and other similar electronic devices. In other words and by way of example only, a software-implemented method according to one or more embodiments of the present invention may be emulated by a hardware-based VHDL program, which is then implemented in an VHSIC, such as a FPGA.

Having thus described embodiments of the present invention, in detail and by reference to illustrative embodiments thereof, it will be apparent that modifications and variations are possible without departing from the scope of the present invention defined in the appended claims.

What is claimed is:

1. A computer-implemented method of modifying a physical device for use by a particular person, the computer-implemented method comprising:
   receiving, by one or more processors, information from a sensor indicating a detection by the sensor of a sequence of actions performed by an unidentified person, wherein the sequence of actions are physical actions performed in a particular order according to a habitual non-biometric physical routine of a particular person, wherein the physical actions are associated with disparate types of physical movements performed by the unidentified person, wherein each action in the habitual physical routine takes a predefined length of time, and wherein the habitual physical routine of the particular person varies according to a time of day;
   comparing, by one or more processors, the sequence of actions performed by the unidentified person as detected by the sensor to a known sequence of actions for the particular person;
   in response to the sequence of actions performed by the unidentified person as detected by the sensor matching the known sequence of actions for the particular person, identifying, by one or more processors, the unidentified person as the particular person; and
   in response to identifying the unidentified person as the particular person, modifying, by one or more processors, the physical device for use by the particular person, wherein the physical device is at least partially physically unconnected to the sensor, wherein the habitual physical routine of the particular person is a predefined order of the particular person checking a status of a first device, checking a status of a second device, and checking a status of a third device, and wherein the first device, the second device, and the third device are unrelated to an operation of the physical device that is modified for use by the particular person.

2. The computer-implemented method of claim 1, wherein said receiving, by one or more processors, information further comprises:
   receiving, by one or more processors, information from multiple sensors.

3. The computer-implemented method of claim 1, further comprising:
   in response to a first sequence of actions performed by the unidentified person as detected by the sensor failing to match a first known sequence of actions for the particular person, activating at least a second sensor;
   receiving, by one or more processors, information from the at least second sensor indicating a detection of an at least second sequence of actions performed by the unidentified person;
   comparing, by one or more processors, the at least second sequence of actions performed by the person as detected by the at least second sensor to a least second known sequence of actions for the particular unidentified person; and
   in response to the at least second sequence of actions performed by the unidentified person as detected by the at least second sensor matching the at least second known sequence of actions for the particular person, further modifying the physical device for use by the particular person.

4. The computer-implemented method of claim 3, wherein the sensor is a first type of sensor, wherein the at least second sensor is a different type of sensor.

5. The computer-implemented method of claim 4, wherein the sensor is located in a first location, wherein the at least second sensor is located in a second location, wherein the first type of sensor is adapted for the first location, and wherein the second type of sensor is adapted for the second location.

6. The computer-implemented method of claim 3, wherein the first sensor and the at least second sensor are selected from a group of consisting of: a camera; a thermal sensor; and a microphone.

7. The computer-implemented method of claim 3, further comprising:
   setting, by one or more processors, a first confidence level for the first sequence of actions matching the first known sequence of actions;
   setting, by one or more processors, at least a second confidence level for the at least second sequence of actions matching the at least second known sequence of actions;
   in response to the first confidence level failing to reach a predefined level, summing, by one or more processors, the first confidence level and the second confidence level; and
   in response to said summing of the first confidence level and the second confidence level reaching the predefined level, confirming, by one or more processors, that the unidentified person is the particular person.

8. The computer-implemented method of claim 1, further comprising:
   confirming, by one or more processors, that the unidentified person is the particular person based on a context of the sequence of actions performed by the unidentified person.

9. The computer-implemented method of claim 1, wherein the method is performed in a cloud system.

10. A computer program product for modifying a physical device for use by a particular person, the computer program product comprising a computer readable storage medium having program instructions embodied therewith, the program instructions readable and executable by a computer to perform a method comprising:
   receiving information from a sensor indicating a detection by the sensor of a sequence of actions performed by an unidentified person, wherein the sequence of actions are physical actions performed in a particular order according to a habitual physical routine of a particular person, wherein the physical actions are associated with disparate types of physical movements performed by the unidentified person, wherein each action in the habitual physical routine takes a predefined length of time, and wherein the habitual physical routine of the particular person varies according to a time of day;
   comparing the sequence of actions performed by the unidentified person as detected by the sensor to a known sequence of actions for the particular person;
   in response to the sequence of actions performed by the unidentified person as detected by the sensor matching the known sequence of actions for the particular person, identifying the unidentified person as the particular person; and
   in response to identifying the unidentified person as the particular person, modifying the physical device for use by the particular person, wherein the physical device is at least partially physically unconnected to the sensor, wherein the habitual physical routine of the particular person is a predefined order of the particular person checking a status of a first device, checking a status of a second device, and checking a status of a third device, and wherein the first device, the second device, and the third device are unrelated to an operation of the physical device that is modified for use by the particular person.

11. The computer program product of claim 10, wherein the physical device is a second sensor that further monitors the sequence of actions performed by the unidentified person.

12. The computer program product of claim 10, further comprising:
   identifying less than a predetermined quantity of persons based on their respective physical action performed in various particular orders.

13. The computer program product of claim 10, wherein the habitual physical routine of the particular person is a predefined order of the person walking, making a human sound, and stopping while making no human sound.

14. The computer program product of claim 10, wherein the program instructions are executable by the device to cause the device to provide a service in a cloud environment.

15. A system comprising:
   one or more processors;
   one or more computer readable memories operably coupled to the one or more processors; and
   one or more computer readable storage mediums having program instructions stored on at least one of the one or more computer readable storage mediums for execution by at least one of the one or more processors via at least one of the one or more computer readable memories, the stored program instructions comprising:
   program instructions to receive information from a sensor indicating a detection by the sensor of a first sequence of actions performed by an unidentified person, wherein the first sequence of actions are physical actions performed in a particular order according to a habitual physical routine of a particular person, wherein the physical actions are associated with disparate types of physical movements performed by the unidentified person, wherein each action in the habitual physical routine takes a predefined length of time, and wherein the habitual physical routine of the particular person varies according to a time of day;

program instructions to compare the first sequence of actions performed by the unidentified person as detected by the sensor to a known sequence of actions for the particular person;

program instructions to, in response to the first sequence of actions performed by the unidentified person as detected by the sensor matching the known sequence of actions for the particular person, identify the unidentified person as the particular person; and program instructions to, in response to identifying the unidentified person as the particular person, modify a physical device for use by the particular person, wherein the physical device is at least partially physically unconnected to the sensor, wherein the habitual physical routine of the particular person is a predefined order of the particular person checking a status of a first device, checking a status of a second device, and checking a status of a third device, and wherein the first device, the second device, and the third device are unrelated to an operation of the physical device that is modified for use by the particular person.

16. The system of claim 15, wherein the physical device is a second sensor that further monitors the first sequence of actions performed by the unidentified person.

17. The system of claim 15, further comprising:

program instructions to, in response to the first sequence of actions performed by the unidentified person as detected by the one or more sensors failing to match the first known sequence of actions for the particular person, activate a second sensor;

program instructions to receive information from the second sensor indicating a detection of a second sequence of actions performed by the unidentified person;

program instructions to compare the second sequence of actions performed by the person as detected by the second sensor to a second known sequence of actions for the particular unidentified person; and program instructions to, in response to the second sequence of actions performed by the unidentified person as detected by the second sensor matching the second known sequence of actions for the particular person, further modify the physical device for use by the particular person.

* * * * *